United States Patent [19]

Goguen et al.

[11] Patent Number: 4,462,858

[45] Date of Patent: Jul. 31, 1984

[54] SPLICER TAPE FEED MEANS

[75] Inventors: Louis J. Goguen, New Brunswick, Canada; George M. Woodley, Shrewsbury, Mass.

[73] Assignee: King Instrument Corporation, Westboro, Mass.

[21] Appl. No.: 474,460

[22] Filed: Mar. 11, 1983

[51] Int. Cl.³ .......................................... B65H 21/00
[52] U.S. Cl. .................................. 156/506; 156/518; 156/520; 242/56 R
[58] Field of Search .............. 156/157, 502, 505, 506, 156/518, 520; 242/56 R

[56] References Cited

U.S. PATENT DOCUMENTS

| 4,120,718 | 10/1978 | Hudalla | 156/518 |
| 4,264,402 | 4/1981 | Morgan | 156/506 |
| 4,364,791 | 12/1982 | Kincheloe | 156/506 |

Primary Examiner—Michael G. Wityshyn
Attorney, Agent, or Firm—Schiller & Pandiscio

[57] ABSTRACT

An improved splicer for use with an automatic cassette loading machine. The splicer is characterized by a feed means which includes a reciprocating splicing tape feed block, and a feed block housing which slidably supports the feed block.

15 Claims, 8 Drawing Figures

SPLICER TAPE FEED MEANS

The invention relates to a tape splicer for use in an automatic tape cassette loading machine, and more particularly, it relates to improved splicing tape feed means for use with such a splicer. The tape feed means essentially comprises a reciprocating tape feed block with a vacuum channel for holding the splicing tape, a feed block housing for slidably supporting the feed block, and means for reciprocating the feed block so as to urge splicing tape from the splicing tape supply reel to the tape applicator-plunger along grooves formed in the feed block housing.

PRIOR ART

In an automatic tape cassette loader, the magnetic tape being loaded into a cassette is spliced to the leader attached to the cassette hubs by a splicing apparatus known as a splicer. A typical splicer comprises a splicing tape supply reel to hold the splicing tape, cutting means for severing the splicing tape into desired lengths prior to being used for a splice, a reciprocating plunger for applying the severed length of splicing tape, and means for feeding the splicing tape from the supply reel to the area beneath the plunger. Such splicers are well known in the art and are exemplified in U.S. Pat. Nos. 4,364,791, 4,204,898, 4,061,286, 3,997,123, 3,814,652, and 3,753,835. These splicers generally utilize tape feed means comprising one or more tape feed wheels or rolls which urge the splicing tape from the supply reel to the plunger by means of a pressure roller applying force against one of the tape feed rolls. As the splicing tape passes between the pressure roller and tape feed roll, the applied pressure provides for positive traction between the tape and feed roll.

One problem with splicers of the type described is that the splicing tape cannot be easily hand-threaded from the supply reel to the plunger when a fresh roll of splicing tape is initially positioned on the splicer. This is because the tape must be looped around several relatively small components such as the tape feed rolls. This threading operation can be time-consuming for a person operating the automatic cassette loading machine and results in reduced efficiency in the tape loading process.

These splicers also have the problem that the adhesive side of the splicing tape makes a rubbing contact with various contact surfaces of the tape feed components. This rubbing contact results in the transfer of sticky adhesive material from the splicing tape to the contact surfaces. The surfaces tend to become gummy and require periodic cleanings.

Another problem with this type of tape feed means is the high cost of manufacture, maintenance and repair due to the number of moving parts.

OBJECTS OF THE INVENTION

Accordingly, it is a primary object of this invention to eliminate or substantially reduce the problems noted above. More specifically, it is an object of the invention to provide a splicer and a method for feeding splicing tape which are superior to those disclosed in U.S. Pat. Nos. 4,364,791, 4,204,898, 4,061,286, 3,997,123, 3,814,652, and 3,753,835.

A further object of the invention is to provide a splicer having splicing tape feed means which allow for easy hand-threading of the splicing tape from the supply reel to the plunger when a fresh roll of splicing tape is positioned on the splicer.

A still further object is to minimize the gumming up of the contact surfaces of the tape feed components comprising the tape feed means.

Another specific object is to provide a new splicer which is characterized by simplicity of construction.

A final object of the invention is to facilitate removal and replacement of the tape feed components relative to the splicer mounting plate.

SUMMARY OF THE INVENTION

Attainment of these objects is achieved by an improved splicer having splicing tape feed means comprising a horizontally-reciprocating tape feed block with a vacuum channel for holding the splicing tape by suction, a feed block housing providing slidable support means for the feed block, a groove or track along one side and the bottom of the feed block housing so as to accommodate and guide the splicing tape, one or more vacuum slots in the bottom surface of the housing to help hold the splicing tape by suction, a tape deflector positioned below the bottom groove so as to support the adhesive surface of the splicing tape, and means for reciprocating the tape feed block on command so as to feed splicing tape from the supply reel to the area below the plunger. The plunger has a recessed area in its side to accommodate a pivotally mounted cutter blade whose lower end swings away from the plunger when the plunger is fully extended.

BRIEF DESCRIPTION OF THE DRAWINGS

It is to be noted that like numerals refer to like components in the drawings.

DETAILED DESCRIPTION OF THE DRAWINGS

Figure 1:
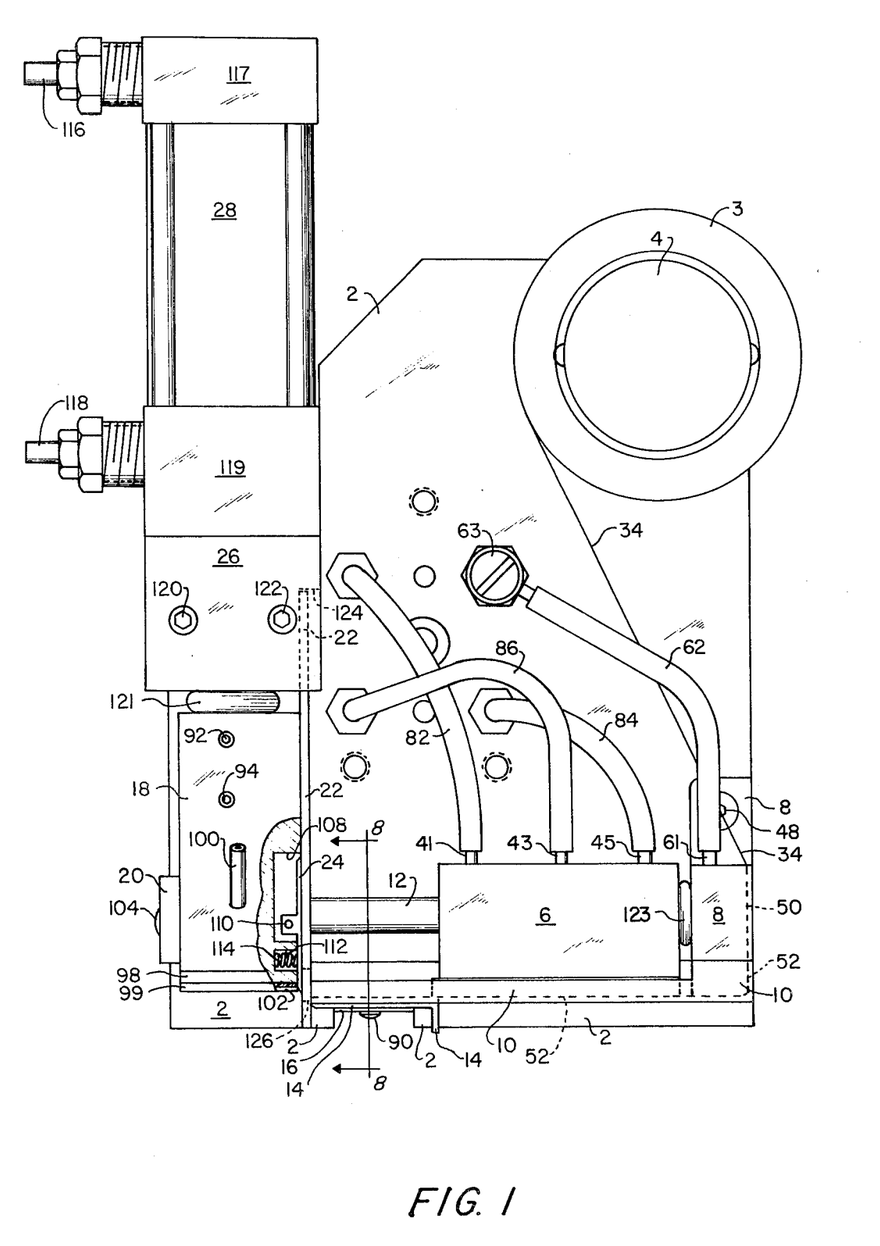
FIG. 1 is a front view in elevation of a splicer embodying the present invention.

Turning first to FIG. 1, the illustrated splicer of the present invention comprises a mounting plate 2, a splicing tape supply reel 3 mounted on a support 4, a tape feed block 6, an upper feed block housing 8, a lower feed block housing 10, a feed block cylinder rod 12, a tape deflector 14, a tape deflection retainer spring 16, a plunger 18, a plunger guide 20, a stationary cutter blade and plunger guide 22, a movable cutter blade 24, a pneumatic actuator mount 26, a pneumatic actuator 28, and various other components described hereinafter.

Mounting plate 2 provides support for most of the other components listed above, and plate 2 may be mounted to other equipment requiring the use of a splicer, e.g., the front panel of an automatic cassette loading machine as described in U.S. Pat. No. 4,204,898.

Tape feed block 6 has a substantially rectangular box-like configuration, with an elongate longitudinally-extending rib 30 (FIG. 7) projecting from the center of its bottom surface. Rib 30 has an elongate vacuum channel 32 (FIGS. 2 and 7) formed in its lower surface to provide means for holding a length of splicing tape 34 to feed block 6. Rib 30 extends along the entire length of the bottom surface of feed block 6 and projects a short distance beyond the end of block 6 which is closest to plunger 18. Feed block 6 also has an elongate longitudinally-extending bore 36. Two counterbores 38 are also formed in block 6—one at each end of bore 36. In addition, feed block 6 has three interior passageways 40, 42, and 44 (FIGS. 6 and 7) which are described hereinafter.

Figure 5:
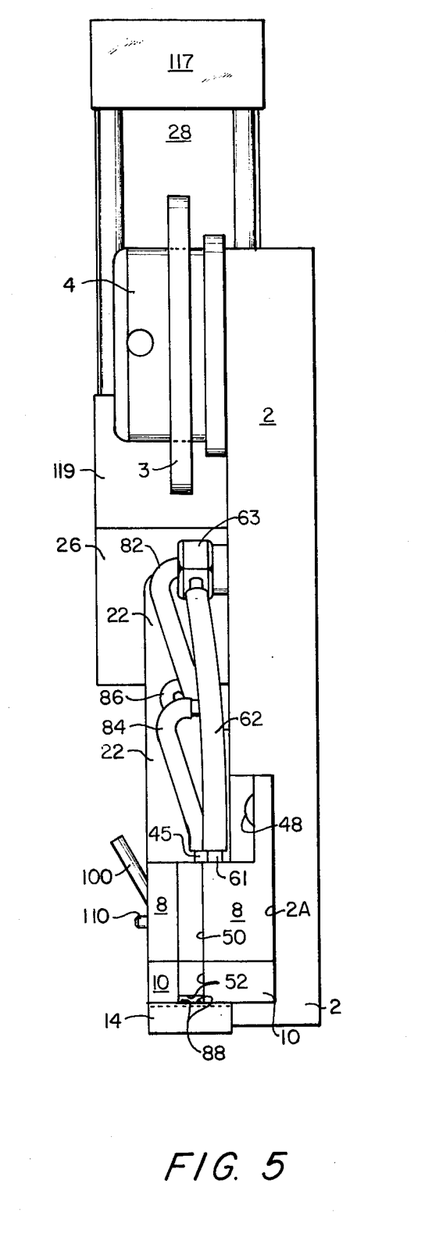
FIG. 5 is an opposite side view of the splicer.

Movement of block 6 is guided in part by a feed block housing assembly formed in two parts—upper housing 8 and lower housing 10. Block 6 is supported by lower housing 10 which has an elongate guideway 46 (FIG. 7) sized to slidably accommodate rib 30 of block 6 so as to allow block 6 to reciprocate back-and-forth on lower housing 10. Lower feed block housing 10 (FIG. 1) has a rectangular block-shaped configuration, with a large portion of its top front section milled out to form guideway 46 and to receive tape feed block 6. Lower housing 10 is secured to mounting plate 2, making a tight fit in a recessed portion 2A of plate 2 (see FIG. 5).

Figure 7:
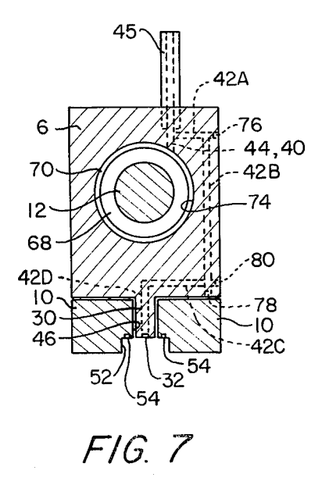
FIG. 7 is a sectional view of the tape feed components taken along line 7—7 of FIG. 6.
Figure 8:
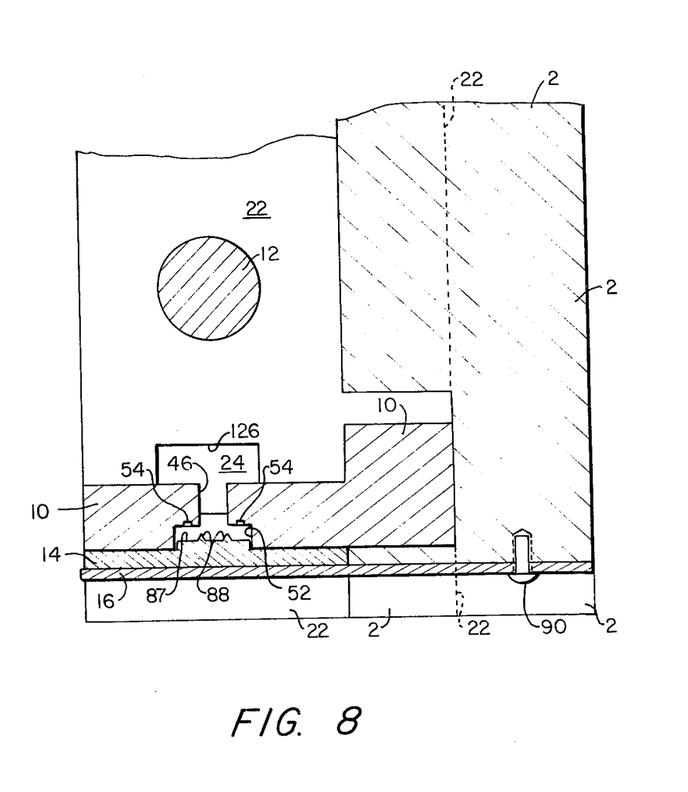
FIG. 8 is a sectional view of several of the tape feed components taken along line 8—8 of FIG. 1.

Upper feed block housing 8 is vertically aligned with the top of lower housing 10 at the end of housing 10 which is farthest from plunger 18. As viewed in FIG. 5, upper housing 8 has an L-shaped configuration and is mounted into recessed section 2A of mounting plate 2 in a manner similar to lower housing 10. Upper housing 8 is affixed to plate 2 by a suitable fastener such as a screw 48. The side of housing 8 farthest from feed block 6 has a vertical groove 50 (FIG. 5) sized to accommodate and act as a guideway for splicing tape 34. A similar groove 52 (FIGS. 1, 5 and 6–8) in lower housing 10 coacts with groove 50 to help from a continuous guideway for tape 34 from supply reel 3 to stationary cutter blade 22. Groove 52 extends along the side of housing 10 farthest from plunger 18 and along the bottom of housing 10 as far as cutter blade 22. As shown in FIG. 8, groove 52 intersects with guideway 46; additionally, two narrow vacuum slots 54 are formed in the surface forming the upper side of groove 52—one slot 54 on each side of guideway 46. Slots 54 are connected to a vacuum source (not shown) via a passageway that comprises two short vertical bores 55 and horizontal bore 56 in housing 10 (FIG. 6), a vertical bore 58 in housing 10, a vertical bore 60 in housing 8, and a vacuum hose 62 connected to bore 60 at the top of housing 8 via a hose fitting 61. Hose 62 is connected to a vacuum source (not shown) through a fitting 63 in mounting plate 2. Vertical bores 59 and 60 are aligned with each other and bore 58 intersects horizontal bore 56 so as to provide a continuous passageway between slots 54 and the vacuum source.

Figure 3:
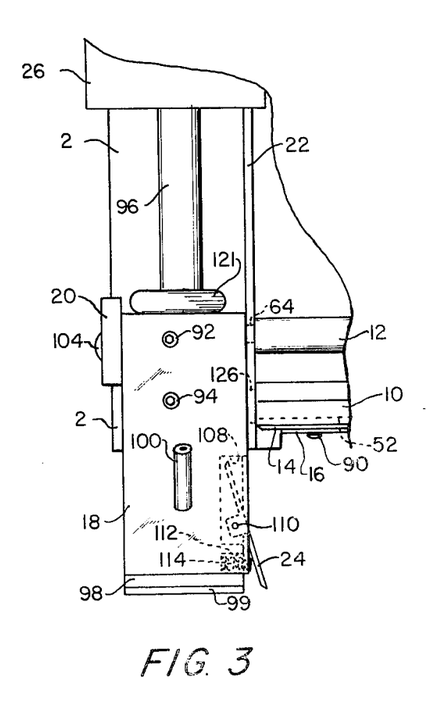
FIG. 3 is a fragmentary front view in elevation showing the splicer plunger in its fully extended position, with the movable cutter blade pivoted so that its lower end is away from the plunger.

As tape feed block 6 and its rib 30 reciprocate in guideway 46, the movement of block 6 is also constrained and guided by feed block cylinder rod 12. Rod 12 is anchored at one end by upper housing 8 (FIG. 6), and at its other end by stationary cutter blade 22 (see FIG. 3). As shown in FIG. 3, a bore in blade 22 receives a reduced-diameter end section 64 of rod 12 so as to support rod 12 at the end. Two mechanical seals 66 and 67 make a force fit in counterbores 38. Each seal 66 and 67 has a central aperture sized to make a close sliding-fit seal with rod 12. Rod 12 has an enlarged-diameter center section 68 having a peripheral groove in which a resilient O-ring 70 is mounted. O-ring 70 makes an airtight sliding fit with the interior surface of bore 36 so as to effectively divide the volume of bore 36 into two distinct variable-volume chambers 72 and 74.

Chamber 72 extends between 0-ring 70 and mechanical seal 66, and chamber 74 similarly extends between O-ring 70 and mechanical seal 67. It is to be noted that as tape feed block 6 reciprocates from side-to-side housing 10 and rod 12, the volumes of chambers 72 and 74 increase or decrease in accordance with the direction of movement of the block 6. For example, as block 6 moves toward plunger 18, the volume of chamber 72 increases and the volume of chamber 74 simultaneously decreases.

Figure 6:
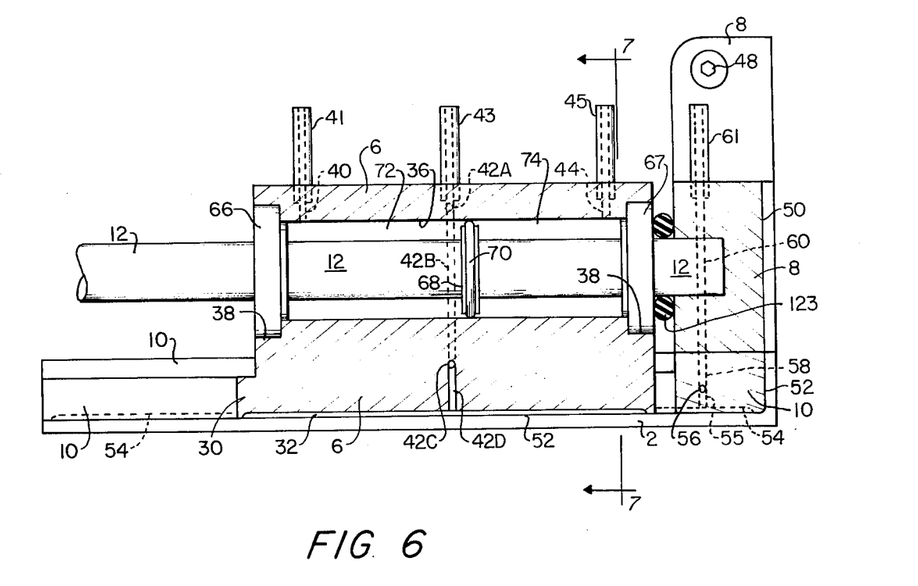
FIG. 6 is a fragmentary sectional view in front elevation of the tape feed components.

Interior passageways 40, 42, and 44 all penetrate the top surface of tape feed block 6 (see FIG. 6). Passageways 40 and 44 are adapted selectively to be connected to a source of high pressure air via suitable flow control valves (not shown). Passageway 40 intersects bore 36 so as to be connected to chamber 72, while passageway 44 similarly intersects bore 36 so as to be connected to chamber 74. Vacuum passageway 42 bypasses bore 36 via two horizontal sections 42A and 42C and a connecting vertical section 42B (FIGS. 6 and 7). Section 42A is connected to the top surface of feed block 6 through hose fitting 43, and section 42C is connected to vacuum channel 32 by section 42D. For ease of manufacture, vacuum passageway sections 42A, 42B, and 42C are formed by drilling from the outside surface of block 6, as shown in FIG. 7, and are then sealed from the outside surface of block 6 by plugs 76, 78, and 80, respectively. Air passageways 40 and 44 are connected to a source of pressurized air (not shown) via air hoses 82 and 84, respectively, which are attached to hose fittings 41 and 45, respectively. Vacuum passageway 42 is connected to a vacuum source (not shown) by a vacuum hose 86 which is attached to fitting 43 (see FIG. 1). Hoses 82, 84, and 86 are connected to the front of mounting plate 2, which has interior vacuum passageways (not shown) leading to the vacuum source.

Figure 2:
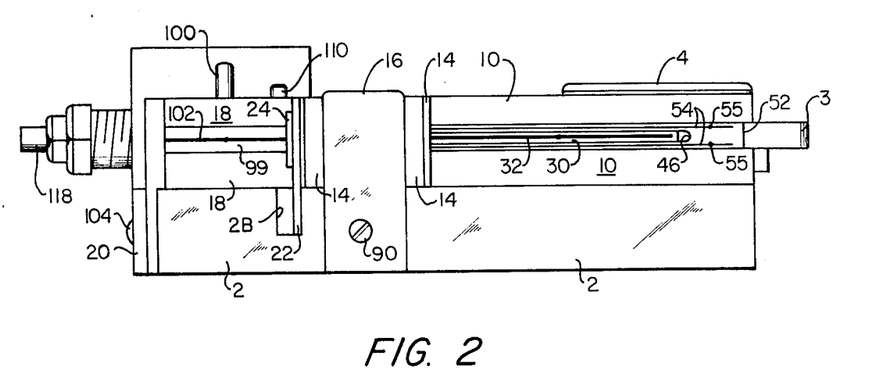
FIG. 2 is a bottom view of the same splicer.

Tape deflector 14 (illustrated in FIGS. 1–3, 5, and 8) overlaps with rib 30 in the direction of movement of splicing tape 34. Tape deflector 14 has an L-shaped configuration with an elongate support ridge 87 (FIG. 8) projecting upward from its top surface and having a width slightly less than the width of groove 52 in lower housing 10. As also shown in FIG. 8, two elongate protuberances 88 project upward from the top surface of ridge 87. Deflector 14 is held in place by tape deflection retainer spring 16, as shown in FIGS. 1–3 and 8. Spring 16 has a thin plate-like shape and is attached to the lower surface of mounting plate 2 by a screw 90 (FIGS. 2 and 8). The bottom edge of plate 2 is recessed (as depicted in FIG. 1) to accommodate spring 16 and thereby allow tape deflector 14 to be positioned flush against the bottom surface of lower feed block housing 10 as shown in FIG. 8.

Figure 4:
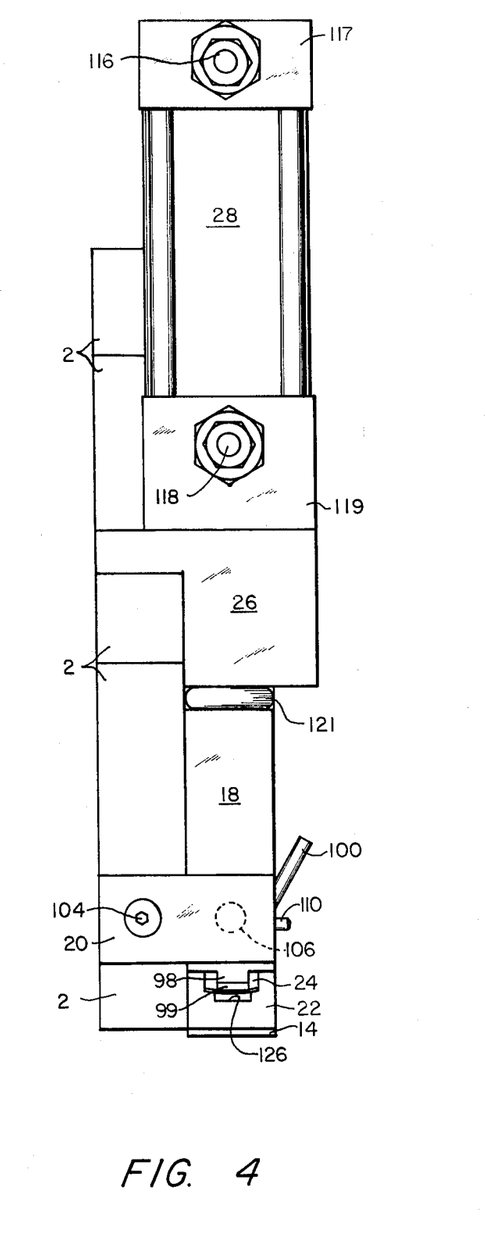
FIG. 4 is a side view of the splicer looking from left to right in FIG. 1.

The remainder of the splicer apparatus shown in FIG. 1 is similar in construction to splicers disclosed in U.S. Pat. Nos. 4,364,791, 4,204,898, 4,061,286, 3,997,123, 3,814,652, and 3,753,835. Plunger 18 has a substantially rectangular block-shaped configuration with two set screws 92 and 94 to attach plunger 18 to piston rod 96 (FIG. 3) of pneumatic actuator 28. Plunger 18 has a rib 98 projecting from its bottom surface which is aligned with rib 30 of tape feed block 6. A resilient pressure pad 99 is attached to the bottom surface of rib 98 to facilitate the application of splicing tape 34 during a splicing operation. A vacuum hose (not shown) is connected to a hose fitting 100 attached to the front of plunger 18. Fitting 100 provides vacuum communication between a narrow slot 102 in pad 99 and a vacuum source (not shown). Vacuum slot 102 provides means for holding a section of splicing tape 34 to the bottom surface of pressure pad 99. Slot 102 is connected to hose fitting 100 through an interior passageway (not shown) in plunger 18. Plunger 18 is located between plunger guide 20 and stationary cutter blade 22 in a manner allowing vertical reciprocation of plunger 18. Cutter blade 22 is affixed to the pneumatic actuator mount 26 and housing 10, and assists in the reciprocation of plunger 18 by functioning as a plunger guide. Plunger guide 20 is affixed to the end side of mounting plate 2 by a fastener 104. A nylon plunger guide friction pad (not shown) is positioned in a circular recessed area in the side of plunger guide 20 closest to plunger 18 (shown in phantom at numeral 106 in FIG. 4) so as to provide lubrication for plunger 18 as it reciprocates up-and-down with its side nearest guide 20 sliding against the friction pad.

As shown in FIGS. 1 and 3, movable cutter blade 24 is pivotally attached to plunger 18 inside a rectangular recessed area 108 in the side of plunger 18 closest to tape feed block 6. Blade 24 is pivotally attached to plunger 18 by a pivot pin 110 in a manner allowing the upper edge of blade 24 to swing into recessed area 108, while the lower edge of blade 24 swings away from plunger 18. A second recessed area 112 in plunger 18 is located directly below recessed area 108 and has a cylindrical shape to receive a compression spring 114. Spring 114 pushes outward from plunger 18 against the lower portion of movable cutter blade 24, so that when plunger 18 moves below the bottom edge of stationary cutter blade 22, spring 114 will force the lower portion of blade 24 away from plunger 18, and the upper portion of blade 24 will swing into recessed area 108 (see FIG. 3). As long as plunger 18 remains above the bottom edge of blade 22, however, movable blade 24 is constrained to a vertical attitude as it slides along the juxtaposed surface of stationary blade 22.

The vertical reciprocation of plunger 18 is effected by pneumatic actuator 28. Air hoses (not shown) connect the hose fittings 116 and 118 at the ends 117 and 119 respectively of the cylinder of the actuator 28 to a source of pressurized air (not shown) through a suitable control valve (also not shown). The piston rod 96 of the actuator moves downward when pressurized air is admitted to the actuator cylinder via fitting 116; this downward movement of rod 96 causes attached plunger 18 to also move downward. Similarly, when pressurized air is admitted to the actuator cylinder via hose fitting 118, rod 96 moves upward so as to return plunger 18 to its original fully-retracted position. As seen in FIGS. 1 and 3, rod 96 is surrounded by a rubber grommet 121 at its lower end. When the plunger moves upwardly from its lowermost position to its fully-raised position, the grommet 121 acts as a cushion against mechanical shock as well as serving to significantly abate any noise generation. An annular rubber grommet 123 is similarly positioned around feed block cylinder rod 12 at its end adjacent housing 8 so as to minimize noise and mechanical shock from block 6 impacting against housing 8.

Pneumatic actuator 28 is held in place by actuator mount 26 which is affixed to mounting plate 2 by two fasteners 120 and 122 (FIG. 1). Actuator mount 26 has an L-shaped configuration (FIG. 4), with a portion of its lower right side milled away so as to form a recessed area 124 (FIG. 1). Area 124 accommodates the upper end of stationary blade 22, as shown in phantom in FIG. 1 (also see FIG. 5). Blade 22 makes a snug fit in a recessed slot 2B (FIG. 2) in mounting plate 2, and is affixed to actuator mount 26 by a fastener (not shown). Blade 22 has a rectangular aperture 126 (FIGS. 1, 3, and 8) in its lower portion to provide a passageway for splicing tape 34 as it is fed beneath plunger 18.

Operation of the above-identified splicer is now described. Assume that a vacuum source is connected to vacuum slots 54, and the feed block 6 is in its normal start position adjacent housing 8 (as shown in FIG. 1). Feed block 6 is held in this position by means of pressurized air applied to hose fitting 45 and chamber 74. Before it can be used, a supply reel 3 of splicing tape 34 must be attached to plate 2, and the tape 34 must be properly positioned by hand. The tape 34 is passed along the grooves 50 and 52 in housings 8 and 10, and the leading edge of the tape 34 is inserted through aperture 126 in stationary blade 22 below plunger 18. The leading edge of the tape is positioned at the juncture of blades 22 and 24. The splicer is now ready for operation. The splicing tape 34 is now held firmly to the base of groove 52 by the suction force at slots 54. The adhesive surface of tape 34 faces downward and is supported by protuberances 88 of tape deflector 14 so as to prevent tape 34 from sticking to a flat support surface.

A predetermined length of splicing tape 34 is now fed beneath plunger 18 by reciprocating feed block 6. This reciprocation is effected by transferring the application of pressurized air from chamber 74 to chamber 72 via hose 82 and fitting 41. The vacuum pressure is now transferred from slots 54 to channel 32 at the same time that pressurized air is applied to chamber 72 so as to allow the splicing tape 34 to be advanced by block 6. The pressurized air in chamber 72 pushes against mechanical seal 66, forcing block 6 to move toward stationary blade 22 so as to feed splicing tape 34 below plunger 18. The length of splicing tape 34 fed beneath plunger 18 is determined by the length of the stroke of the feed block 6 as it moves between housing 8 and cutter blade 22.

After feed block 6 comes to rest against blade 22, vacuum pressure is reapplied to slots 54 and applied to slot 102, while vacuum pressure is still applied via channel 32. Thereafter plunger 18 is fully extended by actuator 28 in order to sever the length of splicing tape 34 which is held firmly to the bottom of pressure pad 99 by the suction force of slot 102. When plunger 18 moves downward, movable blade 24 slides down along the side of stationary blade 22 and cuts the splicing tape on its downstroke. At the instant that the splicing tape 34 is being cut by blade 24, the splicing tape is held firmly in place by the suction force at slot 102, channel 32, and narrow slots 54. As blade 24 moves below blade 22, its lower portion begins to pivot away from plunger 18, as illustrated in FIG. 3. This allows the bottom edge of blade 24 to clear the splicing block (not shown), on which the splice is made, as plunger 18 reaches its lowermost position and applies the splicing tape to make a splice. As or after the plunger pad 99 presses the severed length of splicing tape 34 against the abutting ends of the tapes to be spliced (not shown), the vacuum connection to slot 102 is terminated. Vacuum pressure to channel 32 is also terminated so as to free block 6 from tape 34 prior to block 6 returning to its original position adjacent housing 8 (vacuum pressure is maintained at slots 54 as block 6 is retracted). Plunger 18 returns to its original uppermost position when pressurized air is terminated at fitting 116 and admitted to fitting 118 of actuator 28 so as to cause piston rod 96 to be retracted into the cylinder of actuator 28. The mechanical shock of plunger 18 banging against the bottom of actuator mount 26 is attenuated by rubber grommet 121. Feed block 6 is moved back toward upper housing 8 by removing high pressure air from fitting 41 and applying high pressure air to fitting 45. The force of the moving block 6 banging against housing 8 is cushioned by rubber grommet 123. Thereafter the block 6 is reciprocated according to the procedure described above to locate another section of splicing tape below plunger 18 and to hold the tape to the plunger by vacuum.

There are several advantages to the tape feed means of the present invention. First of all, when a fresh supply reel of splicing tape has to be mounted onto the splicer, the tape can be hand-threaded with ease as compared to most prior art splicers. All that is required to load the tape is to (1) unwind an adequate length of tape 34 from the supply reel 3, (2) locate the tape in grooves 50 and 52, (3) insert the leading edge of tape 34 into the space between tape deflector 14 and groove 52, and (4) push the leading tape edge through aperture 126 so that the tape edge extends below movable blade 24. This splicing tape hand-threading operation can be performed in much less time than with most prior splicers, resulting in a higher productivity for the cassette loading machine and operator.

Another advantage of the splicer is that the adhesive side of the splicing tape does not make a sliding contact with any surfaces of the tape feed components during the splicing operation. This minimizes the buildup of gummy deposits on the tape feed component contact surfaces from the splicing tape; therefore, the contact surfaces can be cleaned less frequently, again resulting in less downtime for the machine and a correspondingly higher productivity rate.

A further advantage of the present invention is that the splicing tape feed means can be easily removed from mounting plate 2 for maintenance and repair purposes. Removal of screw 90 from mounting plate 2 releases retainer spring 16 and tape deflector 14. Removing screw 14 allows housings 8 and 10 to be pulled free of rod 12 and blade 22, respectively. Blade 22 can be easily removed at this point by removing the fastener holding blade 22 to actuator mount 26. Replacement of the same tape feed components is equally simple. Other advantages of the present invention will be obvious to one skilled in the art.

What is claimed is:

1. A tape splicer comprising in combination:
   means for supporting a supply of splicing tape;
   a tape applicator plunger having a surface for pressing a piece of said splicing tape to two tapes to be spliced;
   a feed block housing having an elongate guideway;
   a tape feed block for transporting splicing tape from said supply support means to a position in advance of said plunger, said tape feed block having a rib slidably received in said guideway and means for holding said splicing tape by suction to said rib;
   means supporting said feed block for reciprocal motion relative to said feed block housing toward and away from said plunger;
   means for reciprocating said feed block relative to said feed block housing;
   means attached to said plunger for cutting a predetermined length of said splicing tape advanced by said feed block;
   means on said plunger for allowing a predetermined length of said splicing tape to be held to said plunger surface by suction; and
   means for reciprocating said plunger in a timed relation to reciprocation of said feed block so that said splicing tape transported by said feed block from said tape supply to said position in advance of said plunger surface is (1) severed by said cutting means, and (2) applied to said two tapes by said reciprocating plunger.

2. A splicer according to claim 1 having a cutter blade pivotally attached to said plunger, and means biasing said cutter blade so that the lower portion of said blade swings away from said plunger when said plunger is extended far enough to contact said two tapes to be spliced.

3. A splicer according to claim 1 having a tape guide groove in said feed block housing.

4. A splicer according to claim 3 further comprising a tape deflector member for non-adhesively guiding the adhesive surface of said splicing tape along said groove.

5. A splicer according to claim 1 wherein said means for reciprocating said feed block comprises first and second interior chambers in said feed block and means for connecting one or the other of said chambers to a pressurized air source so that (1) when air pressure is applied to said first chamber and said feed block moves toward said plunger, and (2) when air pressure is applied to said second chamber said feed block moves away from said plunger.

6. A splicer according to claim 5 wherein said feed block housing further comprises guide means for said splicing tape.

7. A splicer according to claim 6 wherein said guide means comprises a groove extending parallel to and communicating with said guideway, a plurality of holes opening into said groove, and means for connecting said holes to a source of vacuum whereby splicing tape may be held in said groove by suction.

8. A splicer according to claim 7 having tape guide grooves in said feed block housing, and further comprising a tape deflector member for non-adhesively guiding the adhesive surface of said splicing tape along said grooves.

9. A tape splicer comprising in combination:
   means for supporting a supply of splicing tape;
   a tape applicator plunger having a surface for pressing a piece of said splicing tape to two tapes to be spliced;
   means attached to said plunger for cutting a predetermined length of said splicing tape;
   means on said plunger for allowing a predetermined length of said splicing tape to be held to said plunger surface by suction;
   a tape feed block for transporting splicing tape from said supply to a position in advance of said plunger, said tape block having means for holding said splicing tape by vacuum;
   feed block support means for supporting said feed block and for reciprocating said feed block toward and away from said plunger;
   said feed block support means comprising a bore in said feed block, a rod extending through said feed block, means supporting said rod at its opposite ends, means on said rod subdividing said bore into first and second interior chambers, and means for selectively connecting one or the other of said chambers to a pressurized air source so that (1) when air pressure is applied to said first chamber said feed block slides along said rod toward said plunger, and (2) when air pressure is applied to said second chamber said feed block moves away from said plunger.

10. A splicer according to claim 9 wherein said feed block support means comprises a feed block housing having an elongate guideway extending parallel to said rod, and a rib on said feed block slidably received in said guideway.

11. A splicer according to claim 10 wherein said feed block has a plurality of holes in said rib and means for connecting said holes to a vacuum source, whereby splicing tape may be held to said rib by suction.

12. A splicer according to claim 10 wherein said feed block housing further comprises guide means for said splicing tape.

13. A tape splicer comprising in combination:
means for supporting a supply of splicing tape;
a tape applicator plunger having a surface for pressing a piece of said splicing tape to two tapes to be spliced;
means for advancing said splicing tape from said supply support means to a selected position in advance of said plunger surface;
means attached to said plunger for cutting a predetermined length of said splicing tape;
means on said plunger for allowing a predetermined length of said splicing tape to be held in said plunger surface by suction;
means for reciprocating said plunger so that splicing tape moved from said tape supply to said selected position will be severed by said cutting means and applied by said reciprocating plunger to two tapes to be spliced;
said tape advancing means comprising:
a tape feed block having means for holding said splicing tape by vacuum;
a feed block housing;
means supporting said feed block so as to allow said feed block to reciprocate relative to said housing toward and away from said plunger;
an elongate guideway formed in said housing;
a rib projecting from said tape feed block and slidably received by said guideway; and
means for reciprocating said feed block toward and away from said plunger comprising first and second variable volume chambers in said feed block and means for selectively connecting one or the other of said chambers to a pressurized air source so that (1) when air pressure is applied to said first chamber said feed block moves toward said plunger, and (2) when air pressure is applied to said second chamber said feed block moves away from said plunger.

14. A splicer according to claim 13 wherein said feed block housing further comprises guide means for said splicing tape.

15. A splicer according to claim 14 wherein said guide means comprises a tape guide groove in said feed block housing, and further comprising a tape deflector member for non-adhesively guiding the adhesive surface of said splicing tape along said groove.

* * * * *

UNITED STATES PATENT AND TRADEMARK OFFICE
CERTIFICATE OF CORRECTION

PATENT NO. : 4,462,858
DATED : July 31, 1984
INVENTOR(S) : Louis J. Goguen

It is certified that error appears in the above-identified patent and that said Letters Patent is hereby corrected as shown below:

Claim 13, column 10, line 2, the word "in" should be "to".

Signed and Sealed this

Twenty-seventh Day of November 1984

[SEAL]

Attest:

GERALD J. MOSSINGHOFF

Attesting Officer     Commissioner of Patents and Trademarks